United States Patent [19]

Bae

[11] Patent Number: 5,376,978
[45] Date of Patent: * Dec. 27, 1994

[54] FILM-TO-TAPE TRANSFER APPARATUS

[75] Inventor: Jong-Chan Bae, Seoul, Rep. of Korea

[73] Assignee: Dongyang Jonghap Corporation, Chungchong Pukdo, Rep. of Korea

[*] Notice: The portion of the term of this patent subsequent to Nov. 3, 2009 has been disclaimed.

[21] Appl. No.: 859,802

[22] Filed: Mar. 30, 1992

Related U.S. Application Data

[63] Continuation of Ser. No. 606,317, Oct. 31, 1990, Pat. No. 5,160,948.

[30] Foreign Application Priority Data

Mar. 7, 1990 [KR] Rep. of Korea .................. 2645/1990

[51] Int. Cl.⁵ ........................................... G03B 31/00
[52] U.S. Cl. ....................................... 352/1; 358/332; 358/345; 348/97
[58] Field of Search .................. 358/332, 54, 345, 346, 358/348, 347, 214, 215; 352/1, 129, 105, 90; 355/39; 354/110

[56] References Cited

U.S. PATENT DOCUMENTS

| | | | |
|---|---|---|---|
| 1,438,906 | 12/1922 | Douglass | 354/110 |
| 2,158,268 | 5/1939 | Baker | 352/1 |
| 2,341,098 | 2/1944 | Hansen . | |
| 2,645,170 | 7/1953 | Heidecke . | |
| 2,926,559 | 3/1960 | Oppenheimer . | |
| 3,288,023 | 11/1966 | Lane . | |
| 3,418,042 | 12/1968 | Sigl . | |
| 3,510,657 | 5/1970 | Mangiaracina et al. | 354/110 |
| 3,721,761 | 3/1973 | Ewald et al. | 358/214 |
| 3,956,579 | 5/1976 | Doumit | 358/215 |
| 3,995,946 | 12/1976 | Greenberg . | |
| 4,050,793 | 9/1977 | Hoadley | 352/90 |
| 4,239,376 | 12/1980 | Wyller | 355/39 |
| 4,356,514 | 10/1982 | Armstrong et al. . | |
| 4,453,809 | 6/1984 | Hill et al. | 352/129 |
| 4,698,683 | 10/1987 | Schwartz et al. | 358/54 |
| 4,771,343 | 9/1988 | Takenaka . | |
| 4,832,481 | 5/1989 | Beauviala . | |
| 4,901,161 | 2/1990 | Giovanella . | |
| 4,974,068 | 11/1990 | Hiramatsu et al. . | |
| 4,994,831 | 2/1991 | Marandi | 354/110 |

OTHER PUBLICATIONS

Ambico, "World of Video Innovations", pp. 21-24 (Spring 1989).
Ambico, "World of Video Innovations", pp. 19 and 36 (1990).
Brochure of Model V-0612 published approximately Mar. 30, 1988.
Brochure of Model V-0330 published approximately Oct. 1987.
Brochure of Model V-0630 published approximately Nov. 1988.
Brochure of Model V-0550 published approximately Oct. 1, 1990.
Brochure of Model V-0660 published approximately Sep. 22, 1990.
Brochure of Model V-0770 published approximately Dec. 24, 1990.
Brochure of Model V-0880 published approximately Oct. 10, 1990.

Primary Examiner—Monroe H. Hayes
Attorney, Agent, or Firm—Finnegan, Henderson, Farabow, Garrett & Dunner

[57] ABSTRACT

A film-to-tape transfer apparatus suitable for transferring images from movie film, slide film, photograph and the like which includes a case body having a bottom plate therein, a rotary shaft rotatably installed on the bottom plate and having a manipulating knob mounted on the top portion thereof, a supporting member secured to the rotary shaft, a reflecting mirror attached to the supporting member, a glass screen unit provided on the rear side of the case body, a macro-lens provided on the left side of the case body, a fluorescent lamp installed at the right portion inside the case body, a transparent and pushing plate provided on the right side of the case body and slightly spaced with each other for receiving a photograph to be recorded, and a sound mixing unit for controlling the sound to be recorded on the video tape.

23 Claims, 5 Drawing Sheets

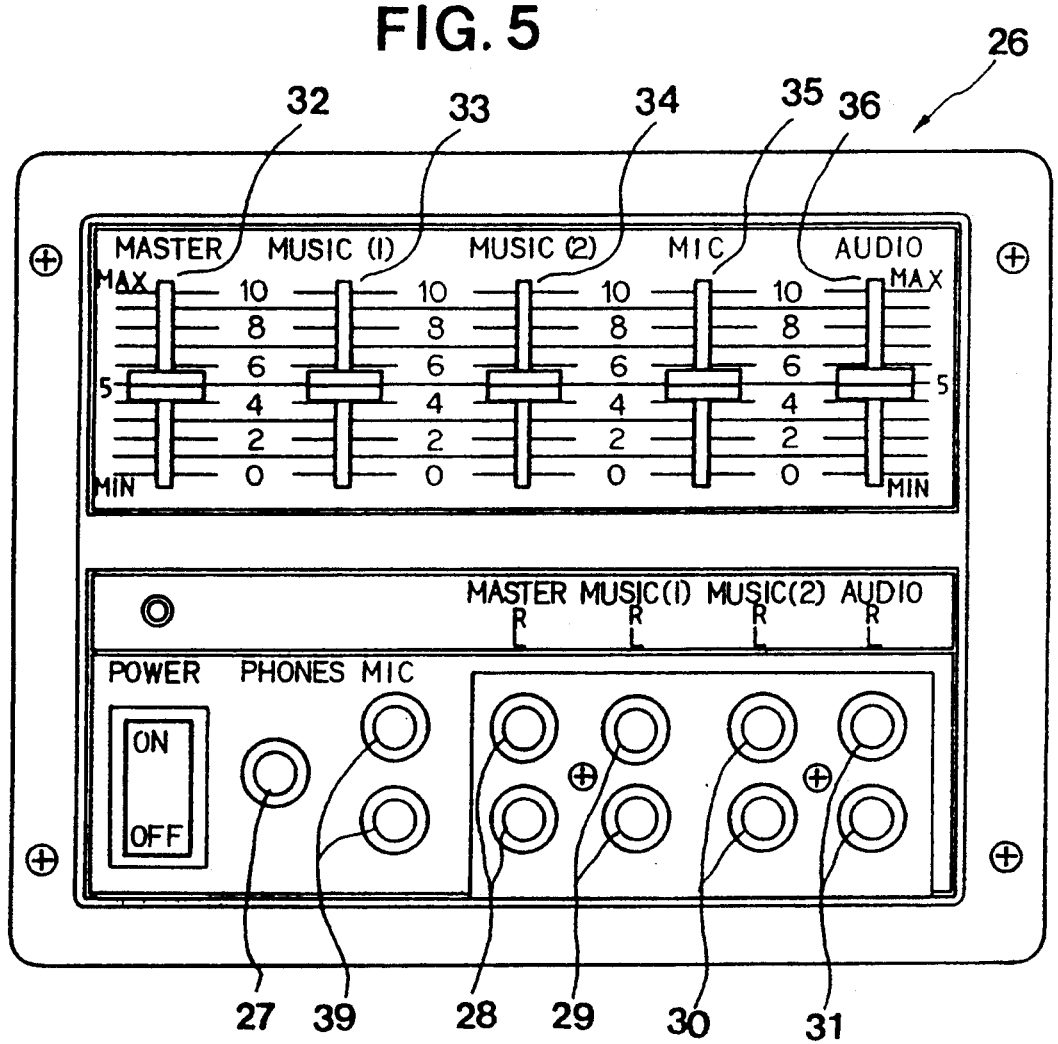
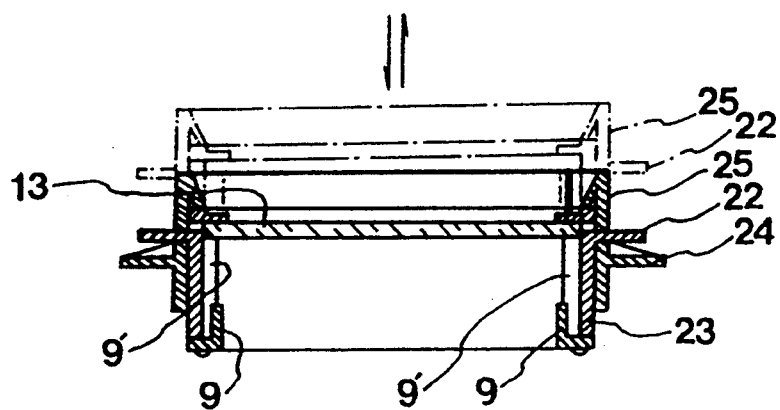

FILM-TO-TAPE TRANSFER APPARATUS

This is a continuation of application Ser. No. 07/606,317, filed Oct. 31, 1990 now U.S. Pat. No. 5,160,948.

BACKGROUND OF THE INVENTION

The present invention relates to a film-to-tape transfer apparatus of the type which is suitable for recording the images of movie film, slide film and photograph on the video tape mounted in a video camera with synchronous sound recording.

Generally, a film-to-tape transfer apparatus for use in transferring the images from many sheets of photographs or movie film onto the video tape can be broadly classified into two types, of which, one is designed to transfer the image from the photograph to be recorded onto the video tape with a fluorescent lamp so as to illuminate the photograph, and the other one has a reflecting mirror in order to reflect the images of the movie film to be recorded into the video camera.

Therefore, it is necessary that two types of the transfer apparatus should be bought for transferring the photograph and the movie film onto the video tape, thus resulting in inconveniences and troublesomeness.

Another problem exists in that since the sound for the video tape will be recorded on the tape once more in accordance with editing and mixing more than two kinds of sounds with voice or stereo music after recording the images of movie film, photograph, slide film and the like on the video tape, the situational explanation at the recording time and other useful information will not be enough to record on the video tape.

Furthermore, the playback state of the video tape recorded by the above conventional transfer apparatus is not clear enough such that the recorded tape will not be preserved under the distinct condition.

SUMMARY OF THE INVENTION

The present invention has been made essentially in an attempt to overcome the above-mentioned problems, and it is a primary object of the present invention to provide a film-to-tape transfer apparatus by which film can be easily recorded onto the video tape mounted in the video camera with synchronous sound recording.

Another object of the present invention is to provide a film-to-tape transfer apparatus by which a valuable past documentary films, photographs and the like can be realistically edited and recorded on the video tape under the clear state to be preserved for a long time, and the sound for the video tape can be synchronously recorded on the tape in accordance with editing and mixing more than two kinds of sounds with voice or stereo music through a sound mixing means.

Further object of the present invention is to provide a film-to-tape transfer apparatus of which illuminance can be promptly and easily adjusted by the user.

The above objects, as well as still other objects and advantages are attained by the present invention which may be described briefly as film-to-tape transfer apparatus, a comprising a case body having a bottom plate therein, a rotary shaft rotatably installed on the bottom plate and having a manipulating knob mounted on the top portion thereof, a supporting member secured to the rotary shaft, a reflecting mirror attached to the supporting member, a glass screen unit provided on the rear side of the case body, a macro-lens provided on the left side of the case body, a fluorescent lamp installed at the right portion inside the case body and electrically connected to an on-off switch, a transparent glass and pushing plate provided on the right side of the case body and slightly spaced with each other for receiving a photograph to be recorded, and the pushing plate having a plurality of resilient tongues thereon, and a sound mixing unit provided on the front side of the case body, and sound mixing unit including a plurality of controllers disposed on the upper portion thereof, and a power switch and a plurality of jacks disposed on the lower portion thereof.

In a preferred embodiment, the glass screen unit comprises a glass screen housing having a pair of engaging protrusions and finger tips, and an aperture formed thereof, a non-reflective glass screen inserted into the inner side of the aperture of the housing, a pair of pushing members having a plurality of rods attached thereon for securing the glass screen, a frame member to be mounted to the rear side of the case body and provided with the glass screen housing therein, and the frame member including a pair of cutoffs formed on the upper and lower portions thereof and a plurality of resilient blades defined on the right and left inner sides thereof, and a fitting cover having a plurality of bending edges formed inwardly on the peripheral edge thereof and a plurality of projections formed on each corner thereof for engagement with the glass screen housing.

In a preferred embodiment, the sound mixing unit comprises a microphone output, an audio input and a music input that are mixed by means of a plurality of variable resistors to input into an amplifier, and the amplifier output is connected to a monitor output through another amplifier and also connected to a master output. The above arrangement is provided on the right and left or the upper and lower portions of the front side of the case body, respectively.

The invention will be understood more fully, while still further objects and advantages will become apparent, in the following detailed description of a preferred embodiment thereof illustrated in the accompanying drawings.

BRIEF DESCRIPTION OF THE DRAWINGS

FIG. 5 is a front elevational view of the present invention showing a sound mixing control panel for use in recording the sounds;

FIG. 6 is an enlarged fragmentary cross-section view of the glass screen unit according to the present invention;

DETAILED DESCRIPTION OF THE PREFERRED EMBODIMENT

The present invention will now be explained in detail by way of a preferred embodiment therein conjunction with accompanying drawings herewith.

Figure 1:
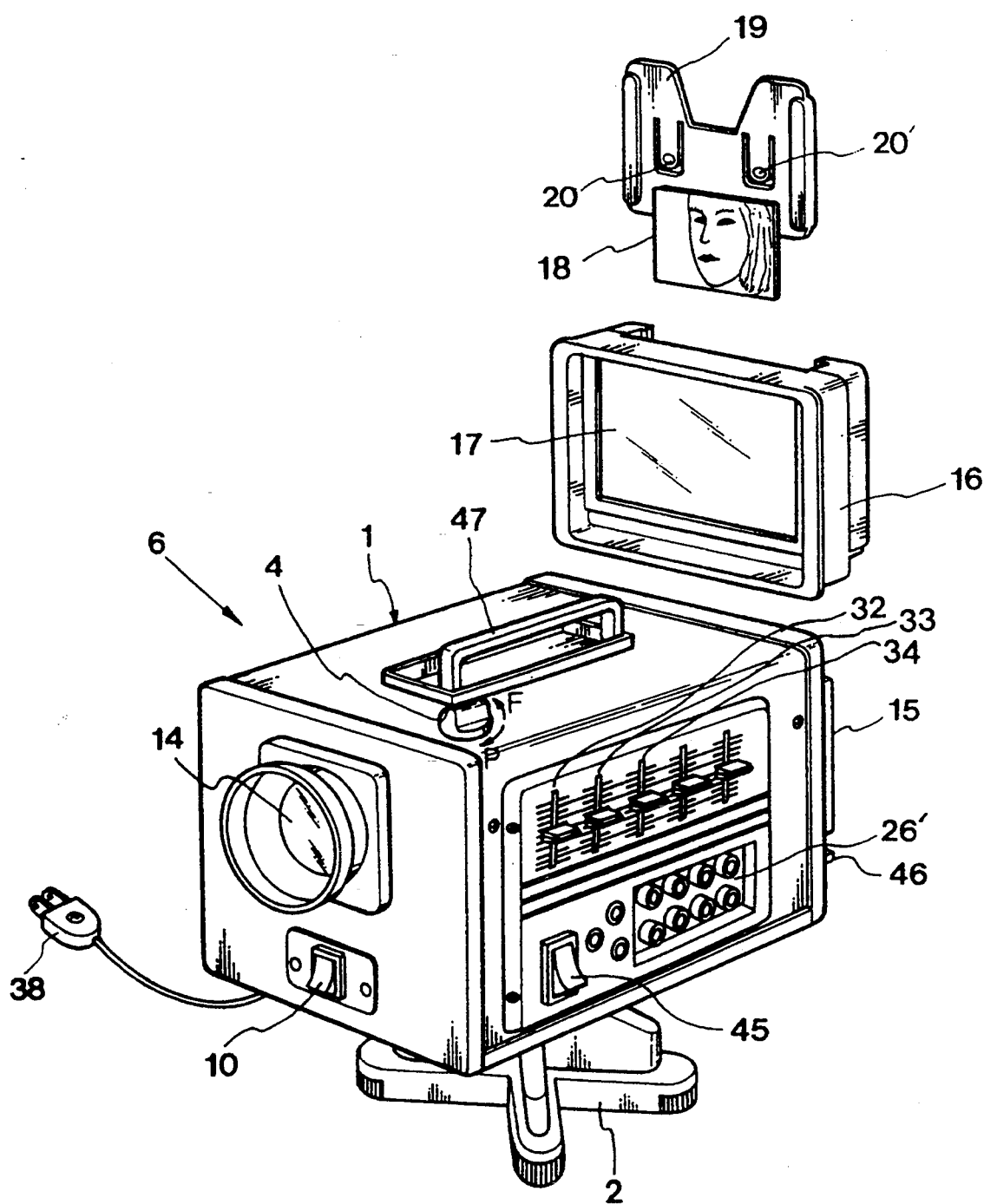
FIG. 1 is a perspective view of a film-to-tape transfer apparatus according to a preferred embodiment of the present invention.

Referring first to FIG. 1, there is shown a film-to-tape transfer apparatus 6 in a perspective view.

A case body 1 of the apparatus 6 has a bottom plate therein and a base unit 2 thereunder.

Figure 2:
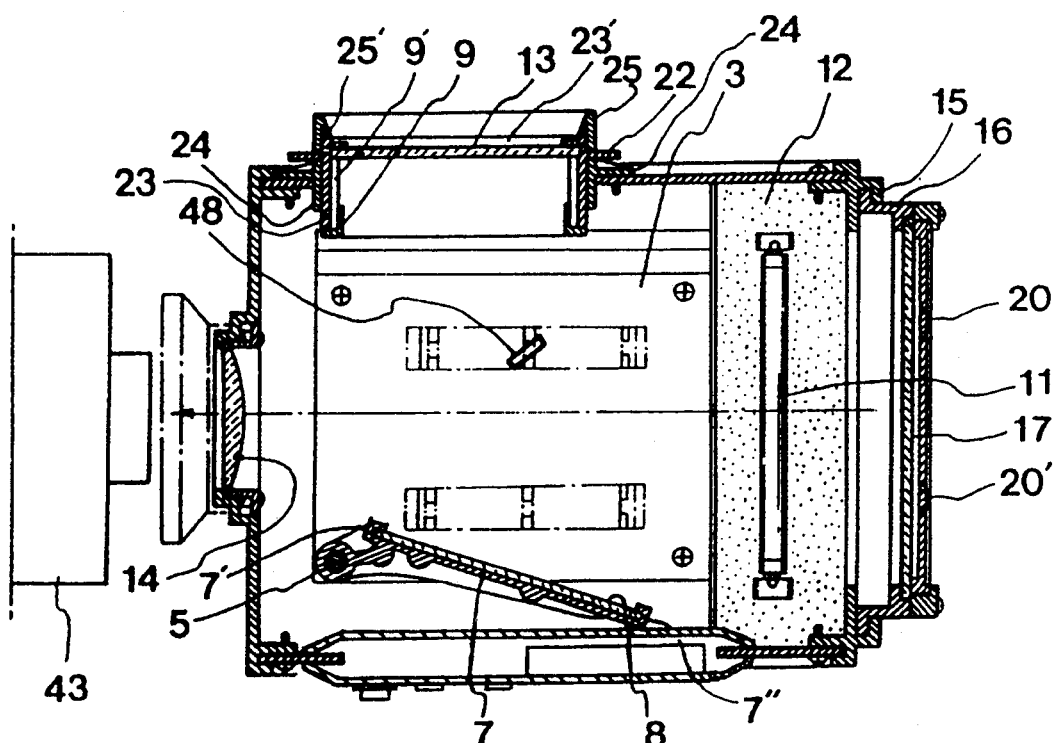
FIG. 2 is a cross-sectional view showing the transfer construction of a film-to-tape transfer apparatus for use in transferring image from photograph to be recorded onto the video tape.
Figure 3:
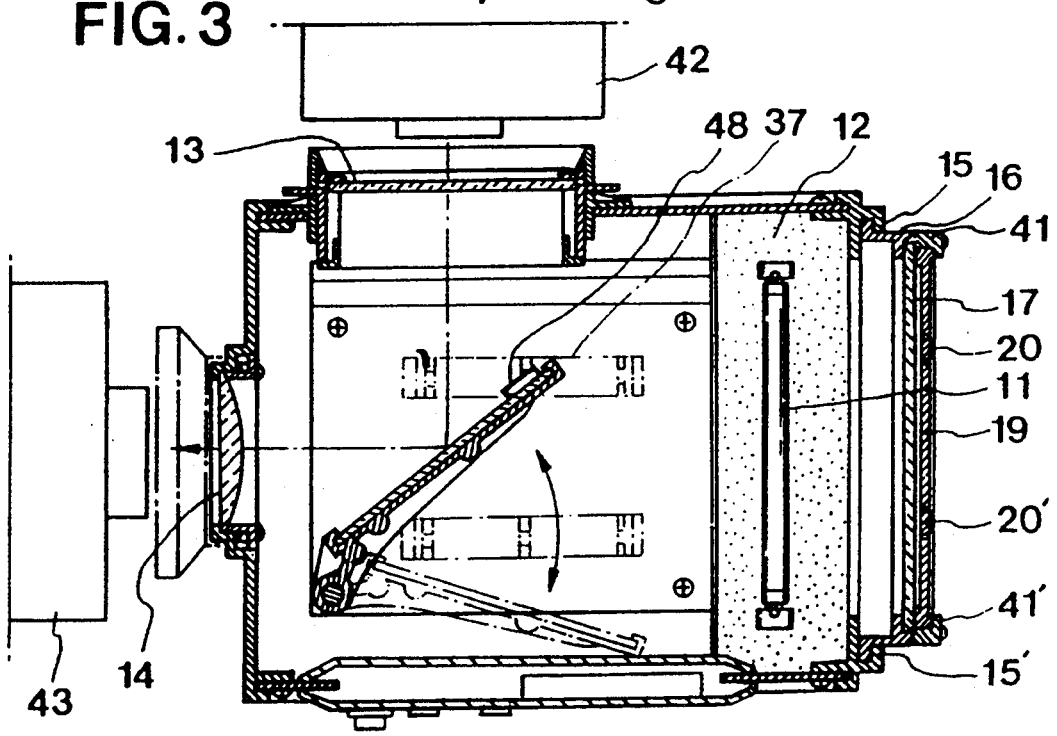
FIG. 3 is a cross-sectional view showing the transfer construction of a film-to-tape apparatus for use in transferring image from movie film to be recorded onto the video tape.

In FIGS. 2-3, a supporting member 7 is secured to a rotary shaft 5 which is vertically and rotatably installed on the bottom plate 3, and also which is capped with a manipulating knob 4 on the top portion thereof.

A reflecting mirror 8 is fixedly inserted into grooves 7' and formed on both sides of the supporting member 7 so as to permit the reflecting mirror 8 to angularly rotate about the rotary shaft 5.

A fluorescent lamp 11 having a reflecting plate 12 thereunder is disposed at one side of the bottom plate 3, and then is electrically connected to an on-off switch 10.

On the other hand, on the left side of the case body 1, there is provided a macro-lens 14 and on the right side of the case body there are formed a pair of grooves 15 and 15' between which a connecting member 16 is fixedly inserted, and then a transparent glass 17 is inserted into the connecting member 16.

In addition, a pushing plate 19 having a plurality of resilient tongues 20 and 20' is detachably attached on the rear side of the transparent glass 17 by setting members 41 and 41' threaded on both sides of the connecting member 16 so as to form a space between the transparent glass 17 and the pushing plate 19, whereinto a photograph 18 can be inserted and also resiliently sandwiched by the resilient tongues 20 and 20' of the pushing plate 19.

Figure 4:
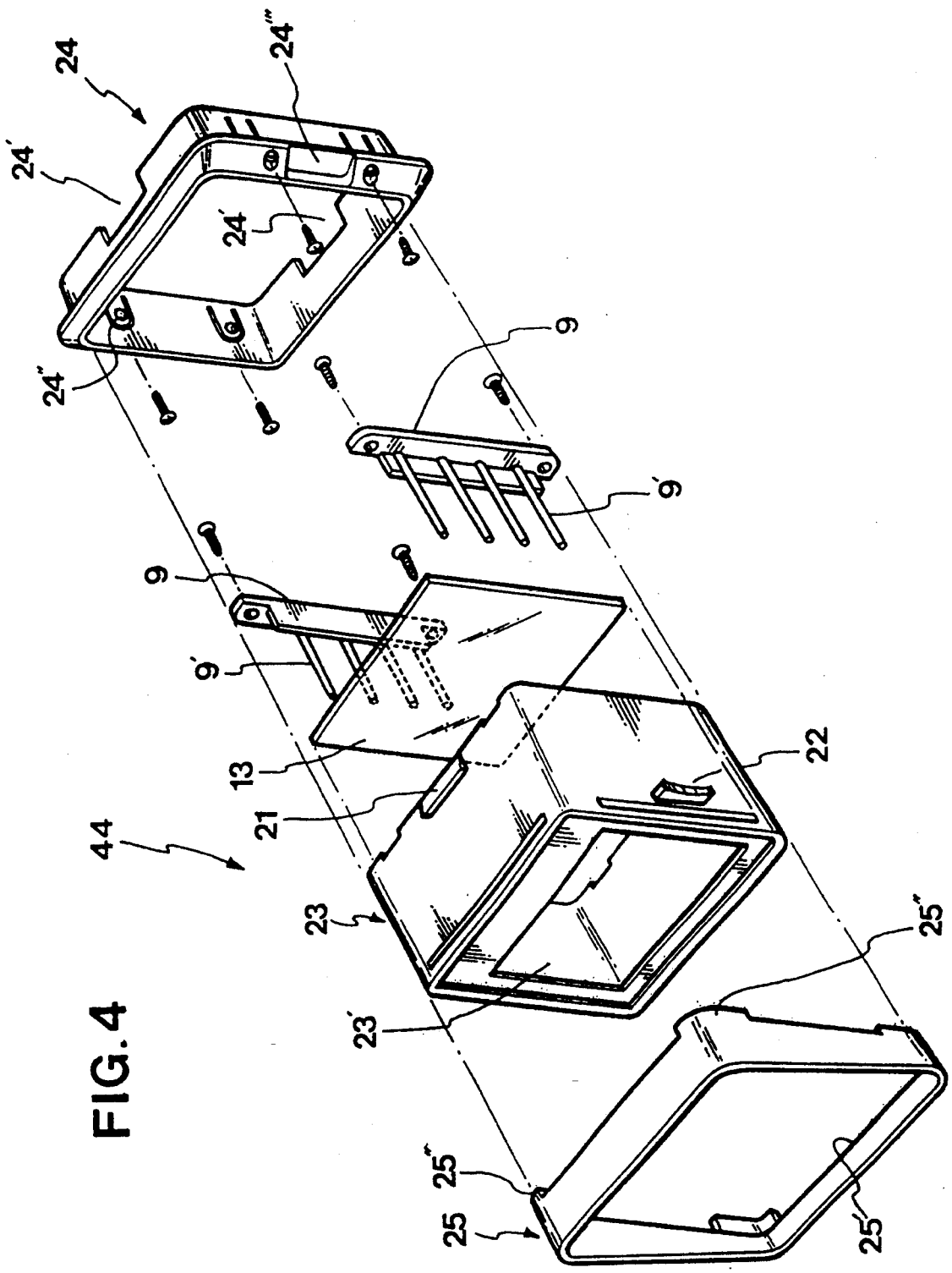
FIG. 4 is an exploded perspective view of a glass screen unit according to the present invention.

As shown in FIG. 4, on the rear side of the case body 1, there is provided a glass screen unit 44 including a glass screen housing 23 which has a pair of protrusions 21 formed on the upper and lower portions thereof and a pair of finger tips 22 formed on the right and left portions, respectively.

The glass screen housing 23 also has a square aperture in which a glass screen 13 coated with non-reflective material is inserted therein, and then the glass screen 13 is secured on both sides thereof by a plurality of rods 9' fixed to each pushing member 9 which is secured on both sides of the glass screen housing 23 by screws.

A frame member 24 is mounted on the rear side of the case body 1 and the glass screen housing 23 is inserted into the frame member 24.

The frame member 24 has a pair of cutoff 24' formed on the upper and lower portions thereof, respectively, for engagement with the protrusions 21, a pair of resilient blades 24" defined on both insides thereof, and a pair of recesses 24''', formed on both sides thereof.

A fitting cover 25 is detachably engaged with the glass screen housing 23 by bending edge 25' inwardly formed on the four sides of the peripheral edges thereof and projections 25" inwardly formed inside the four corners thereof, so that the fitting cover 25 will be in tight fitting with the glass screen housing 23.

On the front side of the case body 1, there is provided a sound mixing unit 26 which comprises a headphone jack 27 disposed at the lower and left side portion thereof for receiving the sound mixing state by a headphone so as to adjust the recording state, an upper and lower microphone jacks 39 for microphone use separating the right and left sounds, or separating the treble and bass tones, and remaining jacks disposed in a sinking portion 26' (shown in FIG. 1) including master jacks 28 for connecting a mixed signal into a video camera 43, or T.V. monitor, music jacks 29 and 30 for connecting to compact disc player, stereo cassette player and the like in order to use background music, audio jacks 31 for receiving the sound from a radio and a tape recorder, and controllers disposed on the upper portion thereof. The controllers include a master controller 32 for adjusting the integrated signal, No. 1 and No. 2 music controllers 33 and 34 for adjusting No. 1 and No. 2 players, a microphone controller 35 for adjusting the sound when recording the sound in stereo state through the left and right microphones, and audio controller 36 for adjusting the audio sound.

Figure 7:
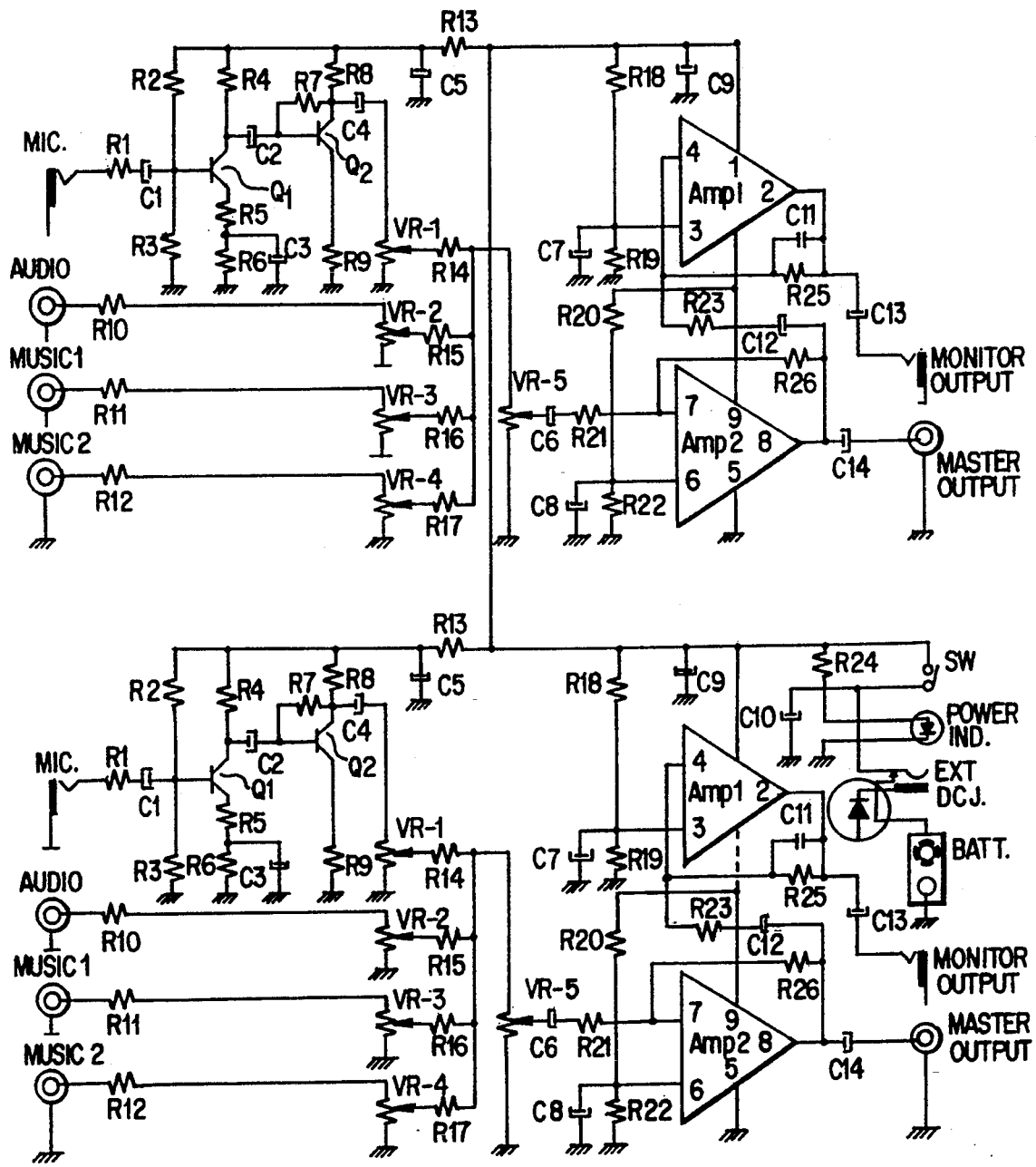
FIG. 7 is an electric circuit diagram for controlling a film-to-tape transfer apparatus of the present invention.

FIG. 7 is an electric circuit diagram for the explanation of the sound mixing unit 26, and in that drawing, an upper part and lower part are separately presented. The upper part is for the left side or right side and the lower part is for the right side or left side, respectively, for recording the sound in stereo manner.

Accordingly, for simple explanation, only one part of the upper and lower parts will be described hereinafter.

An amplifying circuit includes a voice input microphone jack 39 that is connected to the base of a transistor Q1 via a resistor R1 and condenser C1, and an emitter that is connected to earth via resistors R5 and R6, and a collector that is connected to a transistor Q2 via a condenser C2.

A collector of the transistor Q2 is connected to earth via a condenser C4 and a variable resistor VR-1 of which movable terminal is connected to earth via a variable resistor VR-5 of which movable terminal is connected to an amplifier Amp 2 as an input signal via a condenser C6 and a resistor R21. A part of the output of the amplifier Amp 2 is connected to the input side of a monitor amplifier Amp 1 and the other part is connected to the output of a master 32 via a condenser C14.

The output of the monitor amplifier Amp 1 is connected to the output of the master 32 via a condenser C14.

The output of the monitor amplifier Amp 1 is connected in parallel series manner with a condenser C11 and a resistor R25 for feedback to the input side and simultaneously is connected to a monitor output via a condenser C13.

The input of audio 31 is connected to earth via a resistor R10 and a variable resistor VR-2 of which a movable terminal is connected between the resistor R14 and the variable resistor VR-5 via a resistor R15.

Each input of No. 1 and No. 2 musics 29, 30 is connected between the resistor R14 and the variable resistor VR-5 via resistor R11, R12, variable resistor VR-3, VR-4, and resistor R16, R17, respectively.

In the accompanying drawings, reference numerals designated at C3, C5, C7, C8, C9, C10 and C12 are condensers, R2, R3, R4, R7, R9, R13, R18, R19, R20, R22, R23, and R24 are resistors, SW is a power source switch, BATT is a power source, 37 is a battery, 38 is a plug, 46 is a supporting piece, 47 is a handle, and 48 is an engaging projection.

In operation, the manipulating knob 4 is rotated, and then the supporting member 7 is angularly rotated about the rotary shaft 5. Accordingly, the reflecting mirror 8 is angularly rotated, and the fluorescent lamp 11 is on or off by the switch 10 so that the color brightness of the photograph 18 can be clearly adjusted to be recorded on the video tape.

Therefore, when the photograph 18 is to be recorded into the video camera 43, the photograph 18 is inserted into the gap formed between the pushing plate 19 and the transparent glass 17. The resilient tongues 20 and 20' defined on the pushing plate 19 resiliently forces the photograph 18 to be in tight contact with the surface of the transparent glass 17, thereby holding the photograph 18 in the gap.

After the fluorescent lamp 11 is turned on by the switch 10, the manipulating knob 4 is actuated to rotate in the direction of an arrow P so that the reflecting mirror 8 is rotated to the inside wall of the case body 1 as depicted in FIG. 2, and then the video camera is abutted on the macro-lens 14, thus recording the photograph 18 on the video tape mounted in the video camera 43.

On the other hand, when the movie film or slide film is to be recorded on the video tape, the manipulating knob 4 is actuated to rotate in the direction of an arrow F so as to rotate the reflecting mirror 8 to about 45 degrees as depicted in FIG. 3, Accordingly, the image of the photograph 18 is interrupted by the reflecting mirror 8, and simultaneously the image of the glass screen 13 is reflected toward the macro-lens 14 by the reflecting mirror 8. The movie projector 42 is brought to the glass screen 13, so that the image of the movie film or slide film is projected to the reflecting mirror 8 and then the image is reflected from the mirror 8 into the macro-lens 14, through which the image is to be clearly recorded on the video tape mounted in the video camera 43.

Furthermore, the illuminance of the movie projector 42 can be adjusted by means of moving the glass screen housing 23 in the front and rear directions.

Therefore, when the movie film or slide film is to be recorded on the video tape, the glass screen housing 23 is pulled to the front direction in the case when the illuminance of the projector 42 is excessively over the predetermined value, and thus the glass screen housing 23 is pushed to the rear direction in the case when the illuminance is insufficient.

Actually, when the glass screen housing 23 is pulled out by using the finger tips 22 as shown in FIG. 6, the outer surface of the glass screen housing 23 is smoothly slid along the inner surface of the frame member 24 under the spring forces caused by the resilient blades 24" until the upper and lower protrusions 21 is engaged with the upper and lower cutoffs 24', respectively. On the contrary, the glass screen housing 23 returns to the original position by pushing the housing 23 with the finger tips 22.

When the sound is recorded on the video tape in the stereo state by the right and left microphones 39, the sound recording can be controlled by the variable resistor VR-1. Variable resistor VR-2 is connected to the audio jack of the video camera 43 to control the sound.

Furthermore, the variable resistor VR-4 may be selected with one of the music media, or two in order to control the sound when synchronously recording in stereo the different sound or music.

Accordingly, as illustrated in FIG. 5, the variable resistors VR-1, VR-2, VR-3, VR-4 and VR-5 are disposed on the upper portion of the front side of the case body 1, and the variable resistors are simultaneously actuated as shown in FIG. 7.

The microphone jacks 39 can be vertically disposed on the upper and lower portions thereof, for instance, the upper jack is for the right microphone and the lower jack is for the left microphone.

As in the above-described embodiment according to the present invention, when the video movie is shot, or re-edited after shooting, the sound, voice and music are recorded on the video tape in the stereo state while controlling the treble and bass tones.

The photograph, movie film and slide film are transferred onto the video tape while at the same time, the situational explanation and other referential informations of the subject at the time of shooting can be recorded on the tape by the microphone, and simultaneously, more than two kinds of musics can be recorded on the tape in stereo state.

However, by the conventional transfer apparatus, the image of movie film, photograph and the like can not be transferred onto the video tape in one apparatus, and therefore, two types of transfer apparatuses are required for transferring the movie film and the photograph on the tape. In addition, sound is recorded on the video tape after recording the image of the movie film or photograph on the video tape.

As a result, the transferring process of the conventional transfer apparatus the transferring process of is troublesome and time-consuming.

As described above, by the present invention the transferring process can be improved, thereby saving the transferring time.

Moreover, by means of rotating the manipulating knob 4, the reflecting mirror 8 is angularly rotated to selectively record the movie film or photograph on the video tape, and consequently, a film-to-tape transfer apparatus according to the present invention is not only simple in operation but also has the various functions in practical application.

While a specific embodiment of the invention has been illustrated and described herein, it is realized that numerous modifications will occur to those skilled in the art. It is therefore to be understood that the appended claims are intended to cover all such modifications and changes as falling within the true spirit and scope of the invention.

What is claimed is:

1. A film-to-tape transfer apparatus for transferring images from film and photograph and sound to a recording medium to be recorded thereon, comprising:
   a case body;
   a screen unit mounted to the case body and having a screen, the screen displaying an image in an interior of the case body at times when the image is projected onto the screen exterior of the case body;
   a lens mounted in the case body for projecting the image onto the recording medium;
   a photograph mounting assembly mounted to the case body for placing the photograph image in a fixed position facing the interior of the case body;
   a member including a reflecting surface for selectively aligning, in the alternative, the lens with the images from either the photograph or the screen to transfer the images to the recording medium;
   a plurality of electrical connectors mounted to the case body, at least one of said plurality of electrical connectors being an input connector connectable to an external sound source, and another of said plurality of electrical connectors being an output connector connectable to an audio input connector of the recording medium; and a sound amplifier circuit having a plurality of electrical components mounted to the case body, said amplifier circuit having an input portion electrically connected to said at least one input connector and an output portion connected to the output connector, wherein signals from the output portion of the amplifier circuit is applied to the audio input connector of the recording medium and concurrently recordable during transfer of the images to the recording medium, wherein said screen unit includes:

a glass screen housing having a pair of engaging protrusions and a pair of protruding tips, and an aperture formed in the glass screen housing;

a substantially non-reflective glass screen inserted into an inner side of the aperture of the housing;

a pair of pushing members having a plurality of rods attached thereon for securing the glass screen;

a frame member to be mounted to the case body, and provided with the glass screen housing therein, the frame member including a pair of cutoffs formed on the frame member, and a plurality of resilient blades defined on the frame member; and a fitting cover having a plurality of bending edges formed on a peripheral edge of the fitting cover, and a plurality of projections formed on each corner of the fitting cover for engagement with the glass screen housing.

2. A film-to-tape transfer apparatus for transferring images of films and photographs and sound to the recording medium according to claim 1, further comprising a lamp mounted in the case body and electrically connected to a switch for illuminating the image of the photograph.

3. A film-to-tape transfer apparatus for transferring images of films and photographs and sound to the recording medium according to claim 1, wherein the photograph mounting assembly includes a transparent glass and pushing plate, the transparent glass and the pushing plate being slightly spaced from each other for receiving the photograph.

4. A film-to-tape image transfer apparatus for transferring images of films and photographs and sound to the recording medium according to claim 3, wherein said pushing plate includes a plurality of resilient tongues to urge the photograph in the fixed position.

5. A film-to-tape transfer apparatus for transferring images of films and photographs and sound to the recording medium according to claim 1, further comprising means for moving said screen relative to the case body to control illuminance of the film image displayed on the screen and to be transferred to the recording medium.

6. A film-to-tape transfer apparatus for transferring images of films and photographs and sound to the recording medium according to claim 1, wherein said amplifying circuit further comprises means for manually varying amplification of signals applied to the output connector.

7. A film-to-tape transfer apparatus for transferring images of films and photographs and sound to the recording medium according to claim 1, wherein said circuit includes:

a plurality of variable resistors respectively connected to the plurality of electrical connectors; and a first amplifier and a second amplifier, the first amplifier having an output connected to the output connector through the second amplifier, the second amplifier having an output connected to the output connector.

8. A film-to-tape transfer apparatus for transferring images of films and photographs and sound to the recording medium according to claim 1, wherein said plurality of electrical connectors further comprises a microphone input connector connectable to a microphone and a music input connector connectable to an audio output connector of a music source; and wherein the sound amplifier circuit comprises manually operable means mounted to the case for independently varying amplitudes of signals output to the audio input connector of the recording medium.

9. A film-to-tape transfer apparatus for transferring images of films and photographs and sound to the recording medium according to claim 1, further including means coupled to the amplifier circuit for controlling amplitudes of sound signals transmitted to the output connector.

10. A film-to-tape transfer apparatus for transferring images of films and photographs and sound to the recording medium according to claim 1, wherein the plurality of electrical connectors includes a second output connector, the second output connector monitoring audio signals output to the audio input connector of the recording medium.

11. A film-to-tape transfer apparatus for transferring images of film and photograph and sound to a recording medium to be recorded thereon, comprising:

a case body;

an image selector including a reflecting surface mounted in the case body for selecting one of the film image and the photograph image to be recorded;

a screen unit mounted to a first side of the case body and having a screen, the screen displaying an image from an interior of the first side of the case body at times when the image is projected onto the screen from exterior of the case body;

a macro-lens mounted to a second side of the case body for projecting the images from either the photograph or the screen onto another lens of the recording medium;

a photograph mounting assembly mounted to a third side of the case body for placing a photograph in a fixed position with an image facing the interior of the case body;

a plurality of electrical connectors mounted to the case body, at least one of said plurality of electrical connectors being an input connector connectable to an external sound source, and another of said plurality of electrical connectors being an output connector connectable to an audio input connector of the recording medium; and a sound amplifier circuit having a plurality of electrical components mounted to the case body, said amplifier circuit having an input portion electrically connected to said at least one input connector and an output portion connected to the output connector, wherein signals from the output portion of the amplifier circuit is applied to the audio input connector of the recording medium and concurrently recordable during transfer of the images to the recording medium, wherein
said screen unit includes:
a glass screen housing having a pair of protrusions and a pair of protruding tips, and an aperture formed in the glass screen housing;
a substantially non-reflective glass screen inserted into an inner side of the aperture of the housing;
a pair of pushing members having a plurality of rods attached thereon for securing the glass screen;
a frame member to be mounted to the case body, and provided with the glass screen housing therein, the frame member including a pair of cutoffs formed on the frame, and a plurality of resilient blades defined on the frame member; and
a fitting cover having a plurality of bending edges formed on a peripheral edge of the fitting cover, and a plurality of projections formed on each corner of the fitting cover for engagement with the glass screen housing.

12. A film-to-tape transfer apparatus for transferring images of films and photographs and sound to the recording medium according to claim 11, further comprising a lamp mounted in the case body and electrically connected to a switch for illuminating the image of the photograph.

13. A film-to-tape transfer apparatus for transferring images of films and photographs and sound to the recording medium according to claim 11, wherein the photograph mounting assembly includes a transparent glass and pushing plate, the transparent glass and the pushing plate being slightly spaced from each other for receiving the photograph.

14. A film-to-tape image transfer apparatus for transferring images of films and photographs and sound to the recording medium according to claim 13, wherein said pushing plate includes a plurality of resilient tongues to urge the photograph in the fixed position.

15. A film-to-tape transfer apparatus for transferring images of films and photographs and sound to the recording medium according to claim 11, further comprising means for moving said screen relative to the case body to control illuminance of the film image displayed on the screen and to be transferred to the recording medium.

16. A film-to-tape transfer apparatus for transferring images of films and photographs and sound to the recording medium according to claim 11, wherein said plurality of electrical connectors further comprises:
a microphone input connector connectable to an external microphone and a music input connector connectable to an audio output connector of an external music source; and
means for varying amplitudes of signals from the microphone input connector and the music input connector.

17. A film-to-tape transfer apparatus for transferring images of films and photographs and sound to the recording medium according to claim 11, wherein said circuit includes:
a plurality of variable resistors respectively connected to the plurality of electrical connectors; and
a first amplifier and a second amplifier, the first amplifier having an output connected to the output connector through the second amplifier, the second amplifier having an output connected to the output connector.

18. A film-to-tape transfer apparatus for transferring images of films and photographs and sound to a recording medium according to claim 11, wherein said image selector includes:
a rotary shaft rotatably mounted to the case body;
a supporting member secured to the rotary shaft;
a reflecting mirror attached to the supporting member; and
a manipulating member mounted to the case body for moving the rotary shaft from a first position to a second position.

19. A film-to-tape transfer apparatus for transferring images of films and photographs and sound to the recording medium according to claim 11, wherein said amplifier circuit comprises:
a microphone input portion and a music input portion, each portion being electrically connected to a corresponding one of the plurality of electrical connectors;
a master output coupled to the audio input connector of the recording medium, the master output receiving amplified signals from the microphone input and the music input for output to the recording medium.

20. A film-to-tape transfer apparatus for transferring images of films and photographs and sound to the recording medium according to claim 11, further including means coupled to the amplifier circuit for controlling amplitudes of sound signals transmitted to the output connector.

21. A film-to-tape transfer apparatus for transferring images of films and photographs and sound to the recording medium according to claim 11, wherein the plurality of electrical connectors includes a second output connector, the second output connector monitoring audio signals output to the audio input connector of the recording medium.

22. A film-to-tape transfer apparatus for transferring an image of film or photograph and sound to a recording medium to be recorded thereon, comprising:
a case body;
a screen unit mounted to the case body and having a screen, the screen displaying an image in an interior of the case body at times when the image is projected onto the screen exterior of the case body;
a lens mounted in the case body for projecting the image onto the recording medium;
a photograph mounting assembly mounted to the case body for placing the photograph image in a fixed position facing the interior of the case body;
a member including a reflecting surface for selectively aligning the lens with the image from either the photograph or the screen;
a sound mixing unit mounted to the case body including a master output connector connectable to an audio input connector of the recording medium and an input connector connectable to an audio input connector of a sound source, the master output connector producing output audio signals in response to the sound signals, the output audio signals being sent to the video tape of the recording medium for concurrent recording of the output audio signals with the images, wherein
said screen unit includes:

a glass screen housing having a pair of engaging protrusions and a pair of protruding tips, and an aperture formed in the glass screen housing;

a substantially non-reflective glass screen inserted into an inner side of the aperture of the housing;

a pair of pushing members having a plurality of rods attached thereon for securing the glass screen;

a frame member to be mounted to the case body, and provided with the glass screen housing therein, the frame member including a pair of cutoffs formed on the frame member, and a plurality of resilient blades defined on the frame member; and a fitting cover having a plurality of bending edges formed on a peripheral edge of the fitting cover, and a plurality of projections formed on each corner of the fitting cover for engagement with the glass screen housing.

23. A film-to-tape transfer apparatus for transferring an image of film or photograph and sound to a recording medium to be recorded thereon, comprising:

a case body;

an image selector including a reflecting surface mounted in the case body for selecting one of the film image and the photograph image to be recorded;

a screen unit mounted to a first side of the case body and having a screen, the screen displaying an image from an interior of the first side of the case body at times when the image is projected onto the screen from exterior of the case body;

a macro-lens mounted to a second side of the case body for projecting the images from either the photograph or the screen onto another lens of the recording medium;

a photograph mounting assembly mounted to a third side of the case body for placing a photograph in a fixed position with an image facing the interior of the case body;

a sound mixing unit mounted to the case body including a master output connector connectable to an audio input connector of the recording medium and an input connector connectable to an audio input connector of a sound source, the master output connector producing output audio signals in response to the sound signals, the output audio signals being sent to the video tape of the recording medium for concurrent recording of the output audio signals with the images, wherein said screen unit includes:

a glass screen housing having a pair of engaging protrusions and a pair of protruding tips, and an aperture formed in the glass screen housing;

a substantially non-reflective glass screen inserted into an inner side of the aperture of the housing;

a pair of pushing members having a plurality of rods attached thereon for securing the glass screen;

a frame member to be mounted to the case body, and provided with the glass screen housing therein, the frame member including a pair of cutoffs formed on the frame member, and a plurality of resilient blades defined on the frame member; and a fitting cover having a plurality of bending edges formed on a peripheral edge of the fitting cover, and a plurality of projections formed on each corner of the fitting cover for engagement with the glass screen housing.

* * * * *

UNITED STATES PATENT AND TRADEMARK OFFICE
CERTIFICATE OF CORRECTION

PATENT NO. : 5,376,978
DATED : December 27, 1994
INVENTOR(S) : Jong Chang Bae

It is certified that error appears in the above-indentified patent and that said Letters Patent is hereby corrected as shown below:

Claim 11, column 8, line 67 change "is" to --are--.
 column 9, line 4 before "protrusions" insert --engaging--, and
 column 9, line 15 after "frame" insert --member--.

Claim 17, column 9, line 63 change "11" to --16-.

Signed and Sealed this

Sixth Day of June, 1995

Attest:

BRUCE LEHMAN

*Attesting Officer*  *Commissioner of Patents and Trademarks*